Patented Apr. 20, 1954

2,676,170

UNITED STATES PATENT OFFICE 2,676,170

WATER-SOLUBLE DERIVATIVES OF UNSULFONATED LIGNIN

George Harold Patterson, Wilmington, Del., and Walter Jean Balon, Carneys Point, N. J., assignors to E. I. du Pont de Nemours & Company, Wilmington, Del., a corporation of Delaware No Drawing. Application July 15, 1950, Serial No. 174,113

4 Claims. (Cl. 260—124)

This invention relates to novel organic compounds. More particularly, this invention deals with novel, water-soluble derivatives of lignin, useful as tanning agents.

Hides and skins have been tanned with a variety of vegetable extracts such as quebracho, chestnut, hemlock, divi-divi, oak, spruce, sumac, etc. Some of these extracts are imported and at times become scarce and high priced. A number of efforts have been made to provide a domestic source of tanning materials both by growing suitable shrubs and trees from which tanning extracts may be obtained and by converting other raw materials into tanning agents. One of the cheapest and most plentiful raw materials considered is lignin. This is readily available as a by-product in paper manufacture and also in the utilization of farm products.

However, the application of lignin to the problem of tanning has not been developed to date to a commercially successful stage. Lignin itself is insoluble in water, except under highly alkaline conditions. To be applicable as a tanning material, a water-soluble derivative thereof must be employed. Hitherto, the only water-soluble form of lignin available on a commercial scale have been the sulfonic acids thereof obtainable as by-products in the paper industry by the sulfite-pulp process. These, however, do not produce a tanning effect of sufficiently good quality to replace the aforementioned extracts. Furthermore, the vast supply of unsulfonated lignin, obtainable as by-product in the sulfate and soda-pulp processes of paper making and in the working-up of many agricultural residues such as corn cobs, flax shives, oat hulls, cotton-seed hulls and bagasse, have remained hitherto virtually untapped.

Now according to this invention water-soluble derivatives of lignin, of excellent tanning qualities are obtained by reacting lignin in alkaline solution with formaldehyde and chloracetic acid or any other carboxylic acid having a replaceable halogen atom, the reaction being effected simultaneously or in two successive steps, in either order.

The structure of lignin has not been determined definitely to date. Furthermore, its composition often varies with the source employed and with other factors affecting its formation. The recent trend in science is to regard lignin as a polymer based upon a complicated fundamental unit of molecular weight of about 800–1000. This unit is often referred to as the lignin molecule, and will be so employed hereinbelow.

The lignin molecule has been determined to contain aromatic nuclei and furane or pyrane rings. It is also known to bear a relatively large number of methoxy groups and a smaller number of hydroxy groups, of alcoholic and phenolic natures.

It is clear that the reaction which takes place according to our invention cannot very well be formulated by means of an accurate equation. The reaction probably introduces carboxy groups (COOH) and methylol ($CH_2OH$) groups into the molecule. However, in view of the complex nature of lignin itself and in view of the optional alternative procedures available, it is clear that no accurate statement can be made as to the structure of the final compound in all cases.

The aforegoing reactions are preferably carried out in an aqueous medium, the lignin being initially selected as an alkali-lignin, for instance the by-product of the sulfate-process or soda-pulp process of paper making, or it may be selected in the form of lignin proper and dissolved by adding sufficient alkali to the aqueous mass to form alkali-lignin in solution. Under these circumstances, the quantities of aldehyde and halogeno-carboxylic acid subsequently added need not exceed stoichiometric proportions, the unit of M. W. 800–1000 being taken as 1 mole of lignin. However, large excesses of either reagent may be employed, and these do not essentially alter the course of the reaction. In general, it is preferred to use 1–3 moles each of formaldehyde and chloracetic acid per mole of lignin.

The condensation product is preferably acidified for isolation, but may then be readily converted into the sodium salt, ammonium salt or potassium salt by neutralization with the respective hydroxide. All these salts are readily soluble in water and in aqueous-alcohol mixtures.

Without limiting our invention, the following examples are given to illustrate our preferred mode of operation. Parts mentioned are by weight.

PART I.—SYNTHESIS

Example 1

25 parts by weight of alkali lignin were dissolved in 150 parts of water containing 26 parts of 30% sodium hydroxide solution by warming to 60° C., and then 7 parts of 37% formaldehyde were added slowly in ½ hour at 55°–60° C. The reaction mass was heated for 2 hours more at 55°–60° C. After cooling to 10° C., 10 parts of chloracetic acid were added, and the mass was slowly heated, in 1 hour, to 65° C. Heating was continued for 2 hours more at 65° C., additional amounts of 30% sodium hydroxide being added periodically to maintain a pH over 9. The reaction mass, after cooling to 50° C., was acidified strongly to Congo red paper with 30 parts of concentrated hydrochloric acid to precipitate the product, which was filtered hot and washed acid-free with hot water. After drying at 50° C. in a vacuum oven, the product was obtained as a light brown powder.

*Example 2*

42 parts of alkali lignin were dissolved in 300 parts of dioxane with 2 parts of paraformaldehyde and the solution was refluxed at 100°–102° C. for 5 hours. It was cooled to room temperature, and 5 parts of chloracetic acid and 13 parts of 30% sodium hydroxide solution were added. The mass was allowed to stand at room temperature overnight. The dioxane was then evaporated off and a brown resinous material was obtained which was soluble in water when sodium hydroxide was added to give a pH of about 8. This product was ready to use as a tanning agent.

*Example 3*

20 parts of the product of Example 1 were heated for 1 hour in a bomb at 135° C. with 2 parts of sodium bisulfite in 6 parts of water. The resulting product was soluble in water and in water made acid to Congo red. It is presumed that the increased solubility is due to the introduction of sulfonic acid groups into the lignin molecule. The product was used for tanning as in Example 8 below.

*Example 4*

50 parts of alkali lignin were dissolved in 200 parts of water with the aid of sodium hydroxide. 8 parts of 37% formaldehyde and 10 parts of chloracetic acid were added. The mixture was then heated to 55°–60° C. with stirring and 30% sodium hydroxide was added to keep the mixture alkaline to phenol-phthalein. About 15 parts of 30% sodium hydroxide were required. After the mixture remained alkaline, heating and stirring were continued for 1 hour. The mass was made acid to Congo red paper with hydrochloric acid. The precipitate was filtered, washed with water and dried. A brown powder resulted which could be dissolved in water as the sodium salt.

*Example 5*

12.5 parts of sodium hydroxide and 30 parts of 95% alcohol were put in a flask with 25 parts of oat hull lignin. The mass was stirred for 3 hours during which time the temperature gradually rose to 49° C. Then 12.5 parts of chloracetic acid and 15 parts of 95% alcohol were added, and stirring was continued for 2 hours at 55°–65° C. The mass was cooled to 25°–27° C. and 5 parts of 37% formaldehyde were added. The pH was adjusted to 8.0 and the mass stirred at room temperature for 3 hours. 150 parts of water were added. The solution was then ready for use as a tanning agent. Sheepskin tanned with the product as in Example 6 had a shrink temperature of 66° C. and a firm body. The skin was tanned uniformly through.

PART II.—TANNING

*Example 6*

5 parts of the product of Example 1 were dissolved in 45 parts of 95% alcohol and then 1.5 parts of sodium alkane sulfonate (as more fully defined hereinbelow) and 50 parts of water were added. Formic acid was added to bring the pH to 4.5.

5 parts of pickled cowhide were tumbled with 40 parts of 10% sodium chloride solution for 30 minutes and the pH of the liquor was then adjusted to 4.5 with sodium carbonate. The tanning solution above was then added in four equal increments, tumbling for 30 minutes after each addition. After the last addition, tumbling was continued for 4 hours. The tanning liquor was then removed and the skin was fat-liquored with 10 parts of 20% sulfonate cod oil at 120° F. for 30 minutes. The hide was then dried, wet back and staked. A firm, pliable leather was obtained which exhibited a good smooth grain and moderate fullness.

*Example 7*

2.5 parts of the product from Example 2 were dissolved in 44 parts of water containing 1.3 parts of 30% sodium hydroxide and 1.5 parts of sodium alkane sulfonate.

5 parts of pickled sheepskin were tumbled with 35 parts of 10% sodium chloride solution and then the above tanning solution was added. Tumbling was continued for 6 hours. At the end of this time, the skin was removed, rinsed, dried, wet back and staked. A firm but pliable leather resulted with a fair degree of fullness. The shrink temperature was 53° C.

*Example 8*

5 parts of the product of Example 3 were dissolved in 45 parts of water and made acid to a pH of 4.0 with formic acid. This liquor was then used to tan pickled sheepskin which had been tumbled with salt solution as in Example 6. The resultant leather was more uniform in tannage as observed by a cross section of the piece. It had a level grain and was firm and pliable after fat-liquoring.

It will be understood that the above procedures are susceptible of wide variations within the spirit of this invention. Thus, in lieu of chloracetic acid any other halogen-aliphatic carboxy acid or an aromatic carboxy acid having a replaceable halogen atom may be employed. As instances of such may be mentioned chloropropionic acid, chlorobutyric acid, alpha-bromolauric acid, chloracetobenzoic acid, etc.

In lieu of sodium hydroxide in the reaction, potassium hydroxide, calcium hydroxide, or other convenient alkalis may be employed.

The temperature of the reaction may be anywhere from room temperature to about 100° or 105° C.

The alkane-sulfonate dispersing agent employed in Examples 6 and 7 was the product of Example 3 of U. S. P. 2,197,800. But any other common, non-corrosive wetting or dispersing agent may be used in its place, or it may be omitted altogether. Likewise, the function of the alcohol in Example 6 is to assist in dissolving the lignin-formaldehyde-chloracetic product, thereby accelerating the tanning process; but it is not essential, and may be omitted.

Where it is desirable to obtain a more soluble product, other acid groups may be introduced into the molecule, as illustrated by Example 3. In lieu of sodium bisulfite, other sulfonating agents may be used, such as sulfuric or chlorsulfonic acid. Sulfamic acid may also be used. Additional solubilization may also be obtained by treating the product with phosphoric acid to give a phosphate, part of the acid groups being neutralized with an alkali metal for convenience.

For evaluating the quality of the leather produced, we have employed, in addition to general physical appearance, the shrink-temperature method. It is a measure of the degree of tanning, depending on resistance to the action of hot water. It is determined by placing the leather in cold water which is heated gradually. The shrink temperature is the temperature at which the leather suddenly begins to shrink. A value over 50° C. is considered to indicate that a significant amount of tannage has been produced.

The lignin employed in the above examples was of the type called "alkali lignin," obtained from the black liquor arising in the soda-pulping of wood. It is a brown powder; insoluble in water, but soluble in strong alkali. However, it is not necessary to start with pure lignin or with "alkali lignin." Partially oxidized and partially degraded lignin, for example that disclosed in U. S. P. 2,482,594, may be used as well.

The products of this invention have the advantage over the natural vegetable extracts in that they are prepared from readily available materials and are not dependent on imports at varying price levels. Being manufactured chemicals they are also susceptible to close control of quality and need not vary in tanning strength from batch to batch as natural materials do. They may be used to tan various types of leathers such as soft garment leathers, side leather for shoe uppers or sole leather, belting leather, etc. The lignin derivatives may be used as a retan after conventional chrome tanning or after tanning with other synthetic tanning agents such as aliphatic sulfonyl chlorides. They may also be used in admixture with the normal vegetable extracts commonly used as tanning agents.

We claim as our invention:

1. Water-soluble derivatives of lignin, being the compounds obtained by reacting lignin in alkaline solution and at a temperature between room temperature and 105° C., with formaldehyde and a halogen-aliphatic-carboxylic acid, the products possessing carboxylic acid radicals on side chains, forming salts with alkali-metal hydroxides, and being soluble in the form of their alkali-metal salts in water and in aqueous-alcohol mixtures.

2. Water-soluble derivatives of lignin, being the compounds obtained by reacting, at a temperature between room temperature and 105° C., 800 parts by weight of lignin with not less than 30 parts of formaldehyde and not less than 94.5 parts of chloracetic acid, in aqueous alkaline medium, followed by acidification to precipitate the reaction product.

3. The process of producing a water-soluble derivative of lignin, having tanning powers, which comprises reacting lignin, in alkaline solution and at a temperature between room temperature and 105° C., with formaldehyde and a halogeno-aliphatic carboxylic acid, and acidifying the reaction mass to precipitate the reaction product.

4. The process of producing a water-soluble derivative of lignin, having tanning powers, which comprises reacting, at a temperature between room temperature and 105° C., 800 parts by weight of lignin with not less than 30 parts of formaldehyde and not less than 94.5 parts of chloracetic acid, in aqueous alkaline medium, followed by acidification to precipitate the reaction product.

References Cited in the file of this patent

UNITED STATES PATENTS

| Number | Name | Date |
|---|---|---|
| 2,099,717 | Alles | Nov. 23, 1937 |
| 2,184,622 | Mauthe | Dec. 26, 1939 |
| 2,503,297 | Pierce | Apr. 11, 1950 |